Feb. 6, 1962 J. C. BERRY ETAL 3,019,572
HOSIERY PACKAGE
Filed June 6, 1958 7 Sheets-Sheet 3

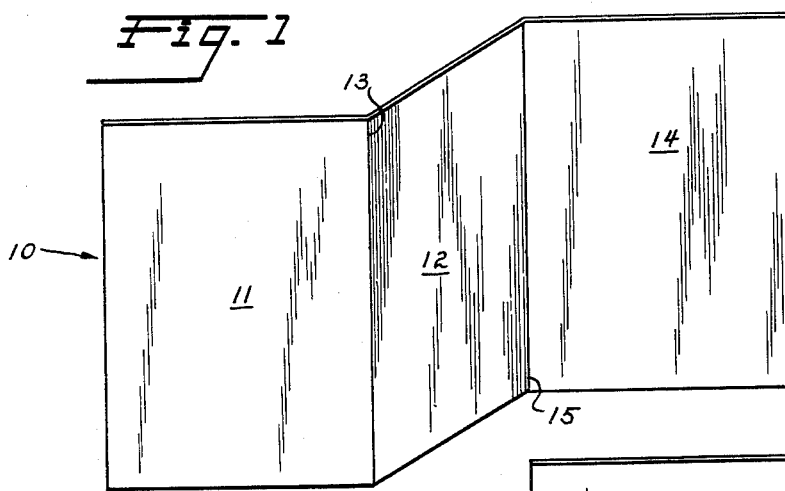
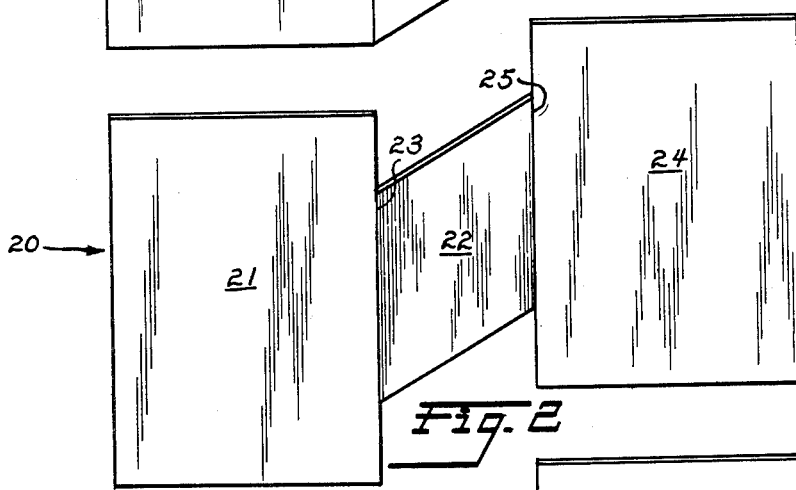
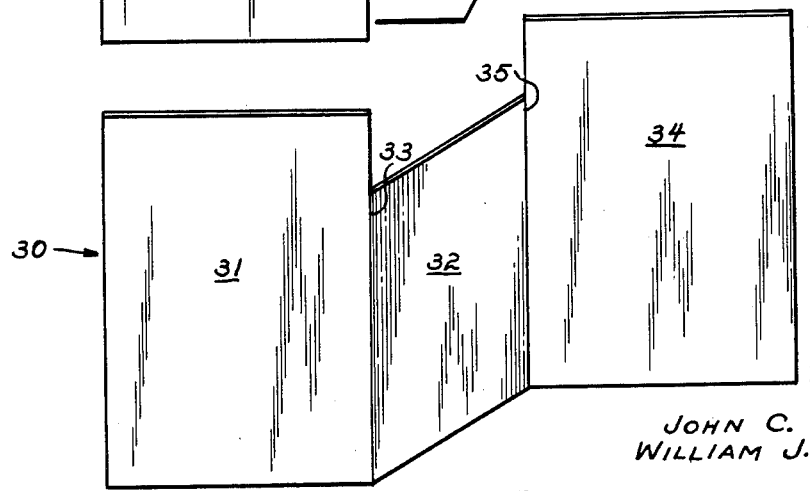

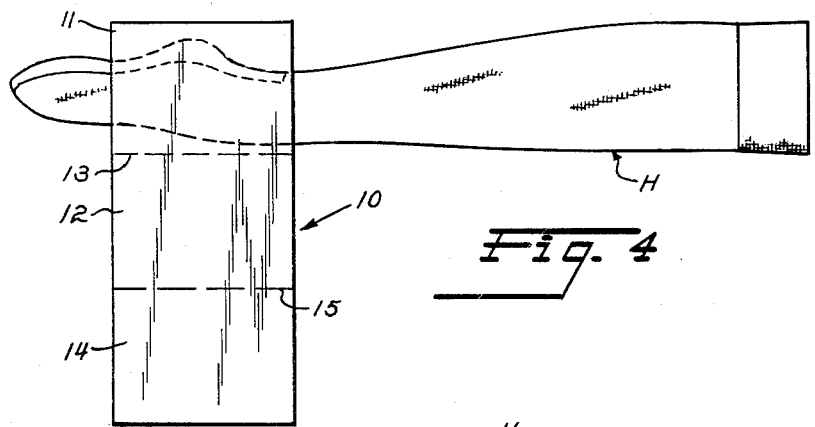
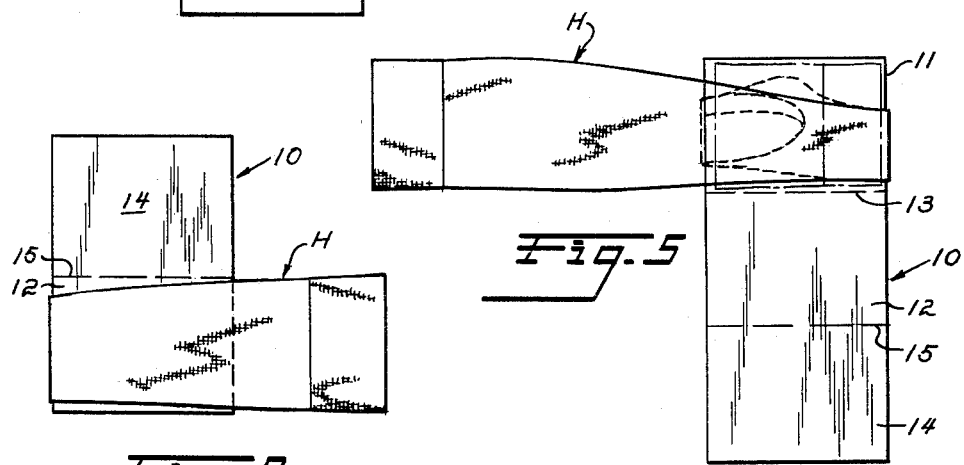
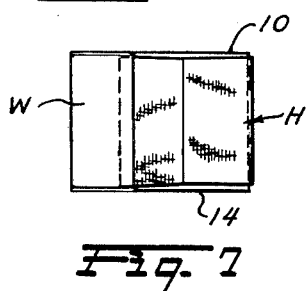
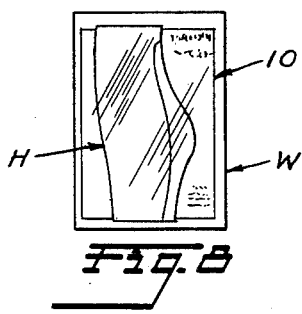

INVENTORS
JOHN C. BERRY
WILLIAM J. BERRY

BY

Jones + Young
AGENTS

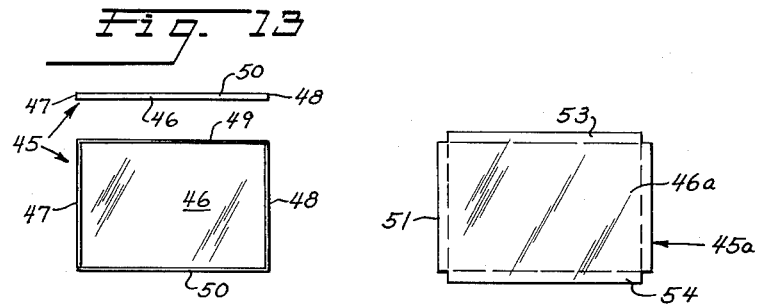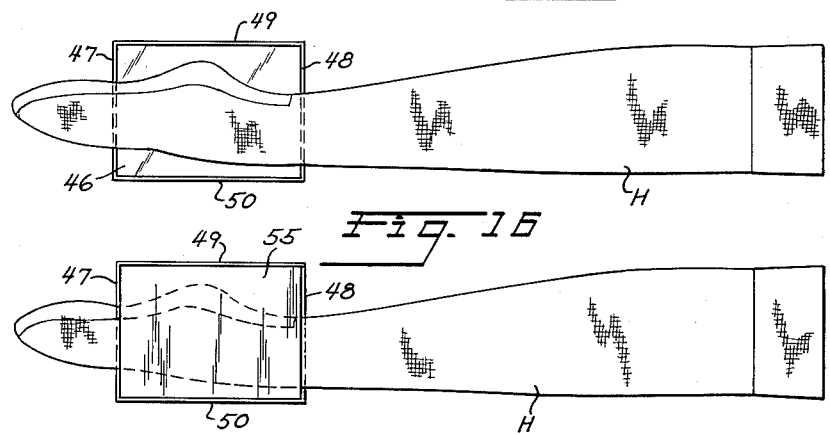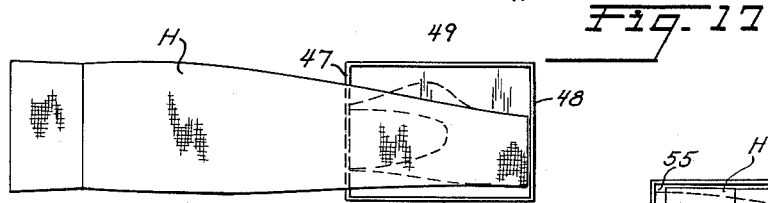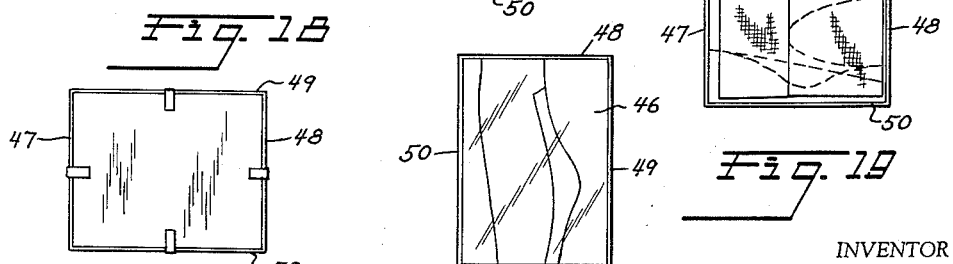

INVENTOR
JOHN C. BERRY
WILLIAM J. BERRY

BY Jones & Young

AGENTS

INVENTOR
JOHN C. BERRY
WILLIAM J. BERRY
BY Jones & Young
AGENTS

3,019,572
HOSIERY PACKAGE
John C. Berry and William J. Berry, both of
Box 946, Durham, N.C.
Filed June 6, 1958, Ser. No. 740,306
22 Claims. (Cl. 53—21)

The present invention relates to a package, and more particularly to a new and improved form of hosiery package for use with ladies' full fashioned hosiery, a method of packaging same, and apparatus to be employed in packaging same. The present invention is a continuation-in-part of our application Serial No. 663,207, filed June 3, 1957, now Patent No. 2,855,097, which covers the stocking package.

Ladies' full fashioned hosiery has been marketed for many years in a wide variety of forms. The basic and most widely used type of packaging is to employ a small box in which usually three pairs of hose are positioned therein in a loose, folded state. This form of package possesses many disadvantages in that the hosiery is of necessity excessively handled by prospective customers, oftentimes causing slight "snags" which will develop into runs in the hosiery after they have been purchased and worn. Moreover, this type of packaging has prevented the stockings from being properly displayed such that a potential customer can visually observe the stockings in the state in which they will appear when worn. Also, the customer cannot ascertain the true shade of the stocking, nor determine the sheerness, without the excessive handling found objectionable.

Another form of marketing which has overcome certain of the disadvantages of the boxes has been to package the hosiery in a cellophane wrapper. In this type of package, each hose is usually provided with a tissue paper insert and the two hose are then folded together and placed in a cellophane wrapper, and the wrapper then sealed. The disadvantage with this type of package has been that the customer has been unable to determine the true shade and color it will possess when worn. Secondly, this type of package makes it possible to market inferior goods as first quality hosiery. Moreover, with this type of package, the customer cannot determine how the hosiery will appear when on the leg.

Other forms of packing have consisted of multiple pairs of hosiery being packaged in a box which is then wrapped with cellophane or like transparent material and sealed. This sealed form of package is provided with an opening in the box in an effort to provide the customer with the color and shade of the hosiery. This has been objectionable in that the hosiery placed one over the other makes it impossible for the customer to determine the sheerness or the true shade and color of the hosiery. Moreover, this type of package likewise makes it possible to market inferior quality goods as first quality hosiery. Further, it is impossible to display this type of package such that the customer will be attracted to it.

Another form of package that has been introduced commercially in recent years is that type in which two pairs of hosiery are wrapped around a cardboard insert and then placed in a cellophane wrapper or the like. This type of package does enable the wearer to observe the hosiery better than the previous form of packages since the hosiery is maintained in a flat, laid-out state. However, this type of package still is objectionable in that the sheerness and color of the hosiery is not possible to determine due to the fact that the hosiery is laid one upon the other and merely folded around the cardboard insert.

It has been found that these foregoing and related disadvantages can be eliminated by the provision of a hosiery package in which a single stocking is placed against one face of a cardboard panel member or insert means such that the heel and ankle portion of the single hose will be laid in a flat, smooth, tensioned state. The remaining leg portion is folded over one end of the first panel member, and then either in a reversely folded state or a directly folded state, over at least a second panel member complementary to the first panel member. The toe portion may be folded either inside between the first and second panel members reversely folded upon itself, or may be folded over the second or additional panel members such that the toe portion will lie flat against the outside face of the panel member. At least one additional hose is placed in a folded state between the two complementary panels. The panels and hosiery positioned thereon will be confined within a sealed cellophane bag. This type of package gives to the wearer a visual presentation of how the stocking will appear in wearing condition prior to purchasing same, as well as enabling the customer to determine the true color and sheerness of the hose prior to purchasing same.

It is therefore a principal object of the present invention, in the elimination of the foregoing and related disadvantages, to provide a new and improved form of hosiery package having all of the advantages possessed by packages heretofore employed without possessing any of the disadvantages thereof.

A further object of the present invention is to provide a new and novel hosiery package.

Yet another object of the present invention is a new and novel method for producing hosiery packages.

Yet another object of the present invention is the provision of new and novel apparatus for producing the hosiery package made in accordance with the present invention.

Still another object of the present invention is the provision of apparatus that is very simple in construction and cheap in cost and operation.

Another object of the present invention is to provide a hosiery package that will present a pleasing appearance to a customer and will permit her to visualize prior to purchase how the hose will appear in wearing condition.

Yet another object of the present invention is the provision of a hosiery package of simple construction and extremely inexpensive in cost.

A still further object of the present invention is the provision of a stocking package which will make it virtually impossible to market inferior hosiery as first quality goods, since it enables the purchaser to ascertain defects therein prior to purchasing without handling the hosiery.

Yet another object of the present invention is the provision of a hosiery package that permits a retailer to maintain a full complement of hosiery in a neat manner for examination by the customers, and to properly and attractively display same, thereby increasing their sale.

Another object of the present invention is the provision of a hosiery package which will enable the purchaser to ascertain the true color and shade of the product.

Still another object of the present invention is the provision of a hosiery package that will permit a customer to ascertain the true sheerness of the hosiery.

A still further object of the present invention is to provide a new and improved hosiery package which can be displayed more advantageously than prior packages.

Other and additional objects of the present invention will become manifest from the ensuing description taken in conjunction with the accompanying drawings.

Broadly stated, the method of forming a hosiery package in accordance with the present invention comprises placing a single hose in a flat, laid-out state, placing first insert means over the angle and heel area of the single hose, reversely folding the leg part of the hose over the first insert means, placing a second insert means over a portion of the leg part of the hose, reversely folding the remaining part of the hose back over the second insert means, reversely folding the toe portion of the hose, placing a second hose between the insert means, and placing the hosiery in a transparent wrapper means.

The apparatus of the present invention comprises a base plate having the outline of the leg, calf, and thigh portions of a hose thereon, the upper portion of said configuration being graduated as to the length of the hose, a second plate in association with said first plate, said second plate having means thereon defining an ankle, a heel, and a portion of the foot portion thereon, said means being in alignment with the configuration on said first plate to define an entire stocking area, said second plate being raisable with respect to said first plate.

The hosiery package of the present invention comprises at least first and second complementary stiff panel members, the heel and ankle portion of a first hose positioned against the outside face of said first panel member in a flat, slightly tensioned, laid-out state, the remaining portion of said first hosiery being folded either downwardly along the top edge of said first panel member and upwardly along the bottom edge of said second panel member or reversely folded and then over the top edge of said second panel member, at least one more hose being placed in a loose, folded state between said first and second panels, and a transparent wrapper enveloping said panel members and said hosiery.

To the accomplishment of the foregoing and related ends, the present invention then consists of the means hereinafter fully described and particularly pointed out in the claims, the annexed drawing and the following description setting forth in detail certain means in the carrying out of the invention, such disclosed means illustrating, however, but one of various ways in which the principle of the invention may be employed.

The present invention is illustrated, by way of example, in the accompanying drawings, in which:

FIGURE 1 is a perspective view of panel members for use in forming a hosiery package in accordance with the present invention.

FIG. 2 is a perspective view of a modified form of panel members for use in forming a hosiery package in accordance with the present invention.

FIG. 3 is a perspective view of a modified form of panel members for use in forming a hosiery package in accordance with the present invention.

FIGS. 4 to 7 represent the steps in forming a stocking package in accordance with the present invention, using the panel members shown in FIG. 1.

FIG. 8 is a top plan view of a completed hosiery package made in accordance with the present invention.

FIG. 13 is a side elevation of a modified form of a transparent wrapper element to be employed in producing a hosiery package made in accordance with the present invention.

FIG. 14 is a top plan view of the transparent wrapper element shown in FIG. 13.

FIG. 15 is a top plan view of a modified form of wrapper element that may be employed in the same manner as the wrapper shown in FIGS. 13 and 14 to produce a hosiery package made in accordance with the present invention.

FIG. 16 is a top plan view of the wrapper element shown in FIGS. 13 and 14 with a first hose positioned thereon.

FIG. 17 is a top plan view illustrating the second stage of operation in producing the modified form of the invention made in accordance with the present invention.

FIG. 18 is a top plan view illustrating the third stage of operation in producing the modified form of hosiery package made in accordance with the present invention.

FIG. 19 is a top plan view illustrating the final folding stage of the modified form of hosiery package made in accordance with the present invention.

FIG. 20 is a top plan view of the modified form of the invention shown in FIG. 19 illustrating the positioning of the final panel member and the securing of same to the wrapper element to produce the modified form of the hosiery package made in accordance with the present invention.

FIG. 21 is a top plan view of the opposite or front side of the hosiery package illustrated in FIG. 20.

Figure 9:
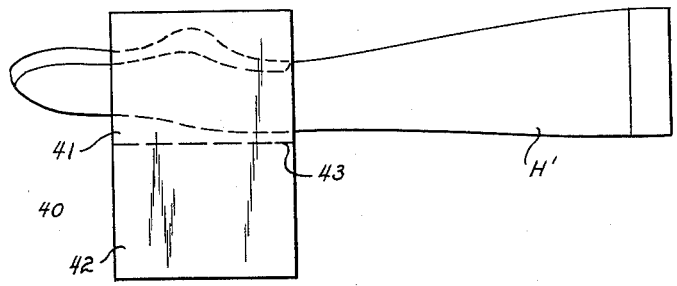
FIGS. 9 to 11 represent the steps in forming the modified form of the stocking package in accordance with the present invention.
Figure 10:
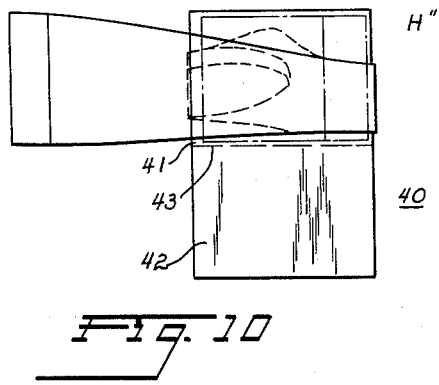
Figure 11:
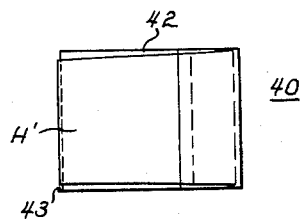
Figure 12:
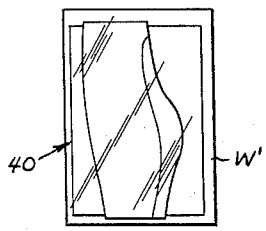
FIG. 12 is a top plan view of a modified form of the completed hosiery package made in accordance with the present invention.
Figure 22:
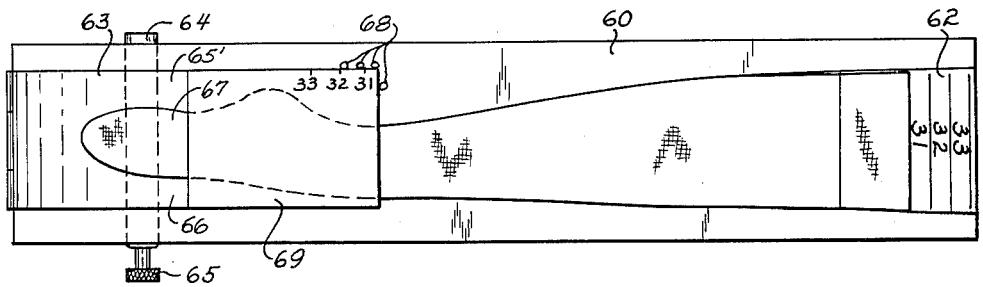
FIG. 22 is a top plan view of the hosiery packaging apparatus made in accordance with the present invention illustrating the positioning of a hose therein with an insert placed in position.

Referring now to the drawings, and with particular reference to FIG. 1, an illustrative embodiment of the insert to be employed in the formation of the hosiery package made in accordance with the present invention, and generally designated by reference numeral 10 is shown. The insert 10 is rectangular in configuration and is made preferably from cardboard, chipboard, or related paper material. The dimensions of the insert 10 must be such that the hosiery may be wrapped over the several panels in a manner to be described more fully hereinafter without unnecessary overhang, or otherwise produce too bulky a package. The insert 10 is of a weight and strength sufficient to support the stockings in a flat position and yet retain its rigidity and original configuration when the hose are mounted thereon in a manner to be more fully described hereinafter and still possess a certain degree of flexibility. The insert 10 should resist bending and the like when subjected to handling. It is preferred that the surfaces of the insert 10 be glazed or otherwise finished to provide a smooth surface.

The insert 10 comprises a first panel member 11, a second panel member 12 which is of substantially the same dimensions as the first panel member 11 and is complementary therewith. The first and second panel members 11 and 12 are united to one another by a fold line 13 extending along the side edge of each of the panels. A third panel member 14 of substantially the same dimensions as the second panel member 12 is joined to the second panel member 12 along the side edge thereof opposite the edge united to the first panel member 11 by a fold line 15. The insert 10 is foldable along the fold lines 13 and 15, with the inner faces of the first and second panel members 11 and 12 being folded into engagement with one another with the outside faces of the second and third panel members 12 and 14 being folded into engagement with one another. This type of folding operation may be termed a Z fold. It should be noted that in this particular and preferred form of the embodiment, three panel members are shown. However, it is to be understood that with certain types and forms of hosiery, it is possible to employ only two panel members folded upon one another. This will apply with all forms of inserts hereinafter described.

Reference is now to be had to FIG. 2 wherein a modified form of an insert to be employed in the present invention and generally designated by reference numeral 20 is shown. The insert 20 may be made from any material employed in producing the insert 10 shown in FIG. 1. The insert 20 comprises a first panel member 21 which is substantially identical with the first panel member 11 shown in the insert 10 of FIG. 1. A second panel member 22 is integrally secured along one side edge to a side edge of the first panel member 21 by a fold line 23. The second panel member 22 is of a height less than that of the first panel member 21 and is centrally disposed with respect to the side edge of the first panel member 21, leaving a cut-out area both above and below the side edge of the first panel member 21. A third panel member 24 of a size substantially identical with that of the first panel member 21 is secured along one side edge by a fold line 25 to the side edge of the second panel member 22 opposite the fold line 23. The third panel member 24 is united to the second panel member in the same relationship as the first panel member 21 such that when folded each will be complementary with one another. The insert 20 is foldable in the same manner as the insert 10, to wit, by a Z fold in which the inside faces of the panel members 21 and 22 will be in engagement with one another while the outside faces of the panel members 22 and 24 likewise will be in engagement. Insert 20 will be found to be of particular utility with smaller size full fashioned hosiery in order to insure the proper positioning on the insert in the formation of the hosiery package.

Reference is now to be had to FIG. 3 wherein still another form of an insert made in accordance with the present invention and generally deisgnated by reference numeral 30 is shown. This form of insert is of particular utility with intermediate size full fashioned hosiery. The insert 30 comprises a first panel member 31 substantially identical with the first panel members 11 and 21 shown in FIGS. 1 and 2. A second panel member 32 is joined along one side edge to the first panel member 31 by a fold line 33. The second panel member 32 is of a height less than the first panel member 31 and extends from the bottom edge thereof up to a point short of the top edge, to thereby form a cut-out area at only one end or edge thereof. The second panel member 32 thus is of a height intermediate that of the second panel member 12 and the second panel member 22 of inserts 10 and 20, respectively, of FIGS. 1 and 2. A third panel member 34 is united to the side edge of the second panel member 32 opposite the fold line 33 by a fold line 34 in the same relationship as the first panel member 31, and is complementary with the first panel member 31 when in a folded state.

In producing a stocking package employing any of the inserts 10, 20, or 30 hereinbefore described, reference will be had only to the insert 10. However, it is to be clearly understood that the same procedure will be employed for all forms of the insert. It should be further noted that where reference has been had to the fold lines in each of the inserts, it is to be understood that a fold area may be provided resulting in the panel members being spaced from one another when folded so as to permit the placing of several pairs of hose in a single package, as will be pointed out more fully hereinafter.

Reference is now to be had to FIGS. 4–8 wherein the several steps to be employed in the formation of the hosiery package made in accordance with the present invention and utilizing insert 10 for illustrative purposes only is shown. A hose H is placed in a flat, laid-out state in a defined area on a worktable, bench, or the like, by the operator, as shown in FIG. 4. The operator places the outside face of the first panel member 11 of the insert 10 over the ankle and heel part of the foot portion of the hose H with the long axis of the panel member 11 being in general alignment with the long axis of the hosiery H. The long axis of the insert 10 will therefore lie generally transverse to the long axis of the hose H, as shown in FIG. 4. The length of the first panel member 11 is such that it will cover most of the foot portion, all of the heel portion, and part of the ankle portion of the hose H, since in the completed package it is this area of the hose H that is to be presented to the purchaser in a flat, laid-out and slightly tensioned state. This part of the hose H is also the portion which will give the consumer the most accurate appearance of the stocking when worn, as well as presenting the shade and quality of the hose best. As shown in FIG. 4, in the first stage of operation, the toe portion and the remaining ankle and leg portion still remains flat and in an uncovered state. This operation is shown clearly in FIG. 4.

In the next operation, the toe portion of the hose H is folded inwardly or backward along the end edge of the panel member 11 and over the inside face of the first panel member 11. The remaining ankle and leg portion of the hose H is folded forwardly along the end edge of the panel member 11 opposite that over which the toe portion was laid, and over the toe portion, as shown in FIG. 5. It should be noted that it is desirable to have the heel and ankle portion in a slightly tensioned, laid-out state. This may be positively insured by providing means for retaining the free end of the toe portion of the hose H in a fixed state against the inside face of the first panel member 11. This may be accomplished by a small band attached at opposite ends to the inside face of the first panel member 11 defining a narrow pocket within which the free end of the toe portion may be positioned. Alternatively, the first panel member 11 may be provided with parallel slits defining a narrow slotted band within which the free end of the hosiery may be positioned.

The remaining part of the insert 10 is then folded forward along fold line 13 with the second panel member 12 being folded over the first panel member 11 in complementary relationship and holding the toe portion and a part of the leg portion in place. The remaining part of the leg portion of the hosiery H is then reversely folded back over the short edge of the second panel member 12, as shown in FIG. 6. The third panel member 14 is folded back over the remaining portion of the hose and in complementary alignment with the second panel member 12, and the remaining portion of the hosiery which is, in effect, the welt portion, is folded back over the short edge of the third panel member as shown in FIG. 7. The welt portion of the hosiery H may be held in position by a wrapper W which extends around the side edge of the hosiery remote from the end over which the hosiery is folded. To accomplish this a portion of the third panel member 14 connected to the second panel member 12 may be provided with a slit to enable the lavel to be held therearound. Alternatively, the edge opposite the edge about which the hosiery is folded may be provided with a foldable tab portion which will be inserted into the welt portion of the hosiery to hold same in position. There are other means and ways readily available by which the end or welt portion of the hosiery may be held in position. For example, a foldable tab portion may be provided which will envelop over the welt portion of the hosiery and hold same in place. With this type, the foldable tab portion can bear advertising or identifying material and the like.

At least one additional hose is placed between two of the folded faces of the insert 11. The insert with the hose H therearound and the additional hose to complete the pair of hose is then placed in a transparent wrapper W, such, as for example, cellophane or the like, to complete the formation of the hosiery package. As has been hereinbefore indicated, it is possible to package more than a single pair of hosiery in a single package. For example, three pairs of hosiery may be packaged in which one hose is positioned in a manner hereinbefore indicated with the five remaining hose then placed in a folded state between two of the folded faces of the panel members of the insert 10. When this is done, the fold lines 13 and 15 will actually become fold areas in order to provide proper spacing between the folded faces of the insert in order for the additional hose to be placed therebetween in a smooth, flat state.

As hereinbefore indicated, the faces of the insert 11 should be glazed or otherwise finished to provide a smooth surface against which the hose will be in engagement. This is necessary in order to prevent snagging of the hose or the like. Moreover, the front face of the first panel member 11 may be provided with decorated material which will function as a border for the heel and ankle portion of the stocking to offset or further enhance the distinctive appearance of this portion of the single hose presented to the customer in this package. Alternatively, advertising or other identifying material may be placed in this border.

As illustrated hereinbefore, one illustrated embodiment of the invention employs three panel members of an insert which are Z folded. It should be noted, as hereinbefore indicated, that it is possible to use a two panel insert.

Reference is now to be had to FIGS. 9–12 wherein the two panel member generally designated by reference numeral 40 comprises a first panel member 41 and a second panel member 42 which are substantially of the same dimensions and are complementary with one another. The first and second panel members 41 and 42, as shown, are united with one another by a fold line 43 extending along the side edge of the panel members whereby the panel members 41 and 42 can be placed in superimposed relationship with respect to one another. The two panel member 40 is, in general, to be employed to produce a hosiery package in substantially the same manner as with the other forms of the invention hereinbefore described.

The first hose H' is placed in a flat, laid out state on the worktable or the like and the first panel member 41 is placed over the foot, heel and ankle portion of hose H' in the same manner as hereinbefore described with the other forms of the invention. The toe portion of the hose H' is reversely folded over one edge of the first panel member as shown and against the back face of the first panel member 41, and the remaining portion of the first hose H' is then reversely folded over the opposite edge of the first panel member 41 and against its back face thereof. Alternatively, the toe portion of the hose H', if desired, may not be folded at this time but rather may be folded at a later stage of the formation of the hosiery package against the back face of the second panel member 42, or in other positions which will be described more fully hereinafter.

At least a second hose H" is placed against the folded leg portion of the first hose H' in a folded state of such size that it will be smaller than the dimensions of the panel member 41. It should be noted that the second hose H" may be placed against the back face of the panel member 41 prior to reversely folding the leg portion of the first hose H' thereover, or any other manner that will insure its disposition between the two panel members 41 and 42. The second panel member 42 is folded, as shown, over the reversely folded leg portion of the hose H' and the remaining portion of the hose is then reversely folded over the back face of the second panel member 42. If the hose H' is long rather than of the stretchy type of hose, it will be found preferable, after the hose has been folded over the back face of the first panel member 41, to reversely fold the hose upon itself and then fold the remaining portion thereof over against the back face of the second panel member 42. It should be further noted that if the back face of the insert 42 is to be bare, the portion of the first hose H' remaining after the first reverse folding operation may be further reversely folded upon itself to confine all of the leg portion of the hose within the confines of the back face of the first panel member 41. The second panel member 42 is then folded over in superimposed relationship with respect to the first panel member. The toe portion of the first hose H', if it has not been folded flat against the back face of the first panel member, may be folded against the outside or back face of the second panel member 42. The hosiery package in any of the forms just described is completed by placing the two panel member 40 and the hose H' and H" in a transparent wrapper or envelope W' in the same manner as with the other forms of the invention.

As illustrated hereinbefore with the various embodiments of the invention shown and described, the inserts or panel members employed in producing the hosiery package have been in the form of two or three panel members united to one another along a fold line, with the fold members folded over one another or in a Z fold. However, it is to be clearly understood that the inserts may be in the form of separate panel members which are placed over one another in superimposed relationship during the folding operation.

In using a two panel member or three panel member as the insert in which the panel members are not united to one another, the same general procedural steps in producing the package are followed. For example, with two separate panel members the single hose is laid out in a flat, elongated state. The first panel member is positioned over the foot, heel and ankle portion of the hosiery in substantially the same manner as hereinbefore described with the other form of the invention employing an integral panel member. The toe portion of the hosiery may be folded over the back face of the first panel member or, if desired, may be folded, as hereinbefore indicated, over the back face of the second panel member, or in other desired positions.

The leg portion of the hose is folded over against the back face of the first separate panel, and at least a second hose placed over the leg portion of the first hose, or in any other position which will insure it being placed between the two panel members. The second panel member may be placed over the hose with the hose being reversely folded thereover against its back face thereof. Alternatively, particularly with hose that are long, the leg portion of the first hose is reversely folded upon itself with the folding line of the first hose lying adjacent the edge of the first panel member. The second, separate panel member then is placed over the reversely folded portion of the first hose, and in superimposed relationship with respect to the first panel member. The remaining portion of the first hose is folded over the edge of the second panel member and against the back face thereof. In general, the portion of the hose lying against the back face of the second panel member in this form of the invention, as well as all the other forms made in this particular manner, will be the full welt portion of the hose with possibly a small portion of the upper leg portion, depending upon the length of the hose.

If the toe portion of the hose has not yet been folded, as hereinbefore indicated, it may be folded over against the back face of the second panel member, thereby resulting in a package in this form as well as the others made in this manner in which the toe and welt portion of the hose both are shown in a wearing, clearly visible state, in addition to the other advantages resulting from the visual presentation of the heel, ankle and foot portion of the hose. The hosiery package is completed by placing the two separate panel members forming the insert and the hosiery carried thereon in the state just described in a transparent wrapper, as in the other forms of the invention.

It should be noted, if desired, that the welt portion of the hose need not be placed against the back or outside face of the second panel member. This will oftentimes be employed, although not necessarily, when the toe portion is folded between the two panel members. To accomplish this, the first hose after it has been folded over the back face of the first panel member and one or more additional hose placed therebetween, is reversely folded in the same manner as hereinbefore described and then reversely folded again back over itself. The second panel member is then placed over the hose. This assembly may then be placed in a transparent wrapper in the same manner as hereinbefore described with other forms of the invention.

To produce a stocking package employing three separate panel members, the same procedure will be employed as described hereinbefore in connection with the insert having the three panel members united to one another in the Z fold manner. However, the method may be modified as described with other forms of the invention herein described with respect to folding the toe portion of the first hose between the panel members or against the back face of the last or outer panel member. Similarly, the welt portion of the hose may be against the back face of the last panel member or may be positioned between the panel members. These modifications may also be employed with the integral three panel Z fold insert. The operation of the three separate panels will be described in detail in the description of the operation of the packaging apparatus made in accordance with the present invention.

Another modification of the present invention is shown in FIGS. 13–21. In this form of the invention, a transparent shell or tray, generally designated by reference numeral 45 and comprising a main bottom portion 46 and opposed end walls 47 and 48 and opposed side walls 49 and 50 united to the bottom portion 46 and to one another is placed on the worktable. The tray 45 may be made from cellulose acetate, cellophane, polyethylene, or similar transparent material. The height or depth of the tray 45 is quite shallow and will in general define the thickness of the completed package. Alternatively, another form of transparent shell in the form of a blank and generally designated by reference numeral 45a is shown in FIG. 15. The blank 45a comprises a main bottom panel 46a and is provided with opposed end wall portions 51 and 52 and side wall portions 53 and 54 in the form of wing portions positioned in a flat, laid out state, and which are foldable with respect to the bottom portion 46a. The operation of the tray 45 described hereinafter in producing the hosiery package will be the same when using the tray 45a.

The shell or tray 45 as hereinbefore indicated is placed on the worktable and the single hose H is then laid out in a flat state, with the foot, heel and ankle portion thereof centrally positioned in the transparent tray 45, as shown in FIG. 16. A single panel member or insert 55 of a dimension substantially equal to that of the bottom portion 46 of the tray 45 is placed therein and against the foot, ankle and heel portion of the hose H, as shown in FIG. 17. This operation results in the foot, ankle and heel portion of the hose H being centrally positioned against the front face of the insert 55 in the same manner as hereinbefore described with other forms of the invention.

The toe portion of the hose H is reversely folded over the back face of the panel member 55, and the remainder of the hose H is folded over the back face of the panel member along the edge opposite to the edge over which the toe portion is folded, as shown in FIG. 18. The remaining part of the hose H is then reversely folded back over itself, and if necessary, reversely folded again back over itself to insure the placement of the first hose H completely within the formed shell such that it will lie in the folded state against the back face of the panel member 55, as shown in FIG. 19. One or more additional hose to be employed in completing the package may be placed over the reversely folded hose H, or may be positioned within any of the reverse folds hereinbefore described.

To complete the formation of the package, a non-transparent panel member 56, either in the form of a flat panel member as shown, or a tray, the flat panel member 56 being of a dimension equal to the dimensions of the panel member 5, is placed within the transparent tray 45 and over the reversely folded hose H. If the second or back panel member is in the form of a tray, the opposed end and side walls of the transparent member will preferably be integrally united to one another to complete the formation of an enclosed hosiery package. If the back panel member is flat, as shown, the end and side walls of the tray 45 may be in the form of foldable wing portions which are folded and then sealed or otherwise secured back over against the back face of the second panel member to complete the package. Alternatively, using the flat board 56, as shown, the opposed end and side walls may be integrally united to one another with the side members thereof being secured to the back face of the second panel member by means of transparent pressure sensitive tape 57, or similar suitable securing means.

Apparatus made in accordance with the present invention and which may be employed in producing the various forms of stocking packages hereinbefore described is shown in FIGS. 22–28. The apparatus comprises an elongated smooth surfaced base member 60 which may be made from metal, such as, for example, aluminum, from plastic, or from any other suitable material. The base member 60 has a leg outline 61 of a part of a lady's hose extending from the welt portion at one end thereof, and terminating just short of the full ankle portion of the hose outline. The welt portion end of the outline 61 at one end of the base member 60 is provided with a plurality of graduation marks 62 denoting the length of the hose being packaged. This will function such that, as will be described more fully hereinafter, the formed stocking package will visibly indicate to the purchaser the exact length of the hose purchased.

Figure 26:
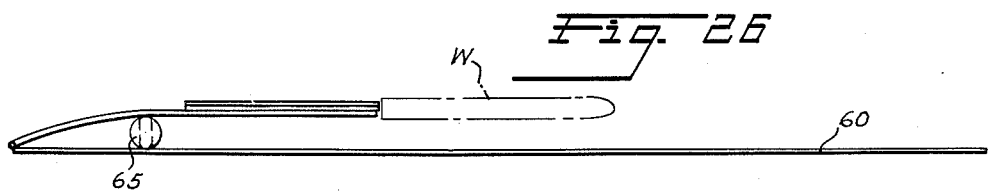
FIG. 26 is a side elevation of the view shown in FIG. 25 illustrating the positioning of a wrapper to envelop the formed package.
Figure 28:
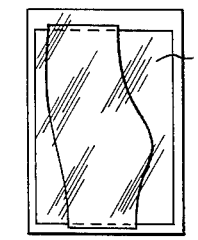
FIG. 28 is a top plan view of the completed hosiery package made with the apparatus and in the manner illustrated in FIGS. 22–26.

The opposite end of the base member 60 is provided with a base plate 63 which is secured at one end thereof to the end of the base member 60, and extends forwardly therefrom for a short distance. The base plate 63 is made from any suitable thin, flexible material such as, for example, aluminum, and is slightly elevatable or flexible with respect to the base member 60. As shown, an elevating rod 64 having an oblong or oval surface configuration is transversely mounted in any suitable manner to the base member 60 and beneath the base plate 63 forwardly of its point of connection to the base member 60. The elevating rod 64 is provided with a knob 65 which, upon rotation, will enable the base plate 63 to be raised above the base member 60, as shown in FIG. 26, for a purpose to become more apparent hereinafter. It should be understood that the elevating mechanism just described is a particular and preferred one, and it should be clearly understood that if the base plate 63 is sufficiently flexible the elevating mechanism can be eliminated and the plate raised sufficiently by hand. Similarly, suitable mechanism, if such is to be used, other than illustrated may be employed to slightly elevate the base plate 63.

The base plate 63 is provided with top plates 65' and 66 positioned in tight engagement to the top surface of the base plate 63 adjacent the forward free end thereof and extending on either side thereof rearwardly therefrom. The top plates 65' and 66 are spaced from one another with their perimetral edges in opposed relationship to one another. The perimetral edges of the top plates 65' and 66 possess a configuration which between them defines an ankle, heel, and foot pocket 67 which is in alignment with the termination point of the leg outline 61 of the base member 60. Thus this arrangement results in a leg outline 61 on the base member 60 which is in perfect alignment with the heel, ankle and foot pocket 67 of the base plate 63 thereby forming a completed hose or stocking outline with a definite pocket for the foot, ankle and heel portion of the hose to be placed on the outline in a manner to be more fully described hereinafter.

A plurality of vertical pins 68 that are very short in length are positioned in spaced relationship with respect to one another on the top plate 65'. The purpose of the pins 68 is to provide centering stops for a panel member when positioned over the heel, ankle and foot pocket 67 of the base plate 63. The pins 68 should be of a height, therefore, just sufficient to block and center the panel member when placed over the pocket 67. It should be clearly understood that the pins 68 are illustrative only of one form of means that may be employed to achieve the desired centering, and other stop means may be employed equally as well. For example, right angle spaced corners may be positioned in spaced relationship on the top plate 65' to achieve the desired stopping and centering of the panel.

To utilize the apparatus just described a single hose H is placed on the bottom or base member 60 with the outline thereof being superimposed over the outline 61 on the base member. The hose H is of a known length. The welt end thereof is placed in registry with the graduation coinciding with the length of the hose. The foot, ankle and heel portion of the hose H will be received in the pocket 67 of the base plate 63, thereby placing the entire hose in a flat, laid out state.

Figure 23:
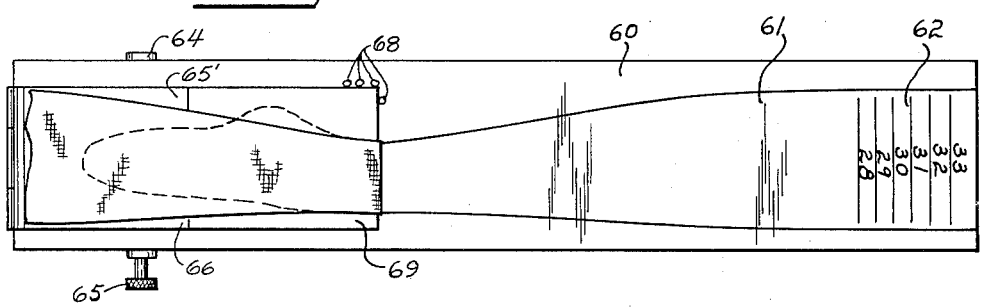
FIG. 23 is a top plan view of the apparatus shown in FIG. 22 illustrating the hose in a first stage of folding.

A single first panel member 69 is placed over the pocket 67 and is stopped and centered with respect thereto by the pins 68, and centering same over the foot, heel and ankle portion of the hose. The remaining leg portion of the hose H is reversely folded over the back face of the panel member 69, as shown in FIG. 23. The toe portion of the hose is not folded at this time in this particular form of invention, but, as will be described more fully hereinafter, will be folded in the final assembly. A second, separate panel member 70 is placed over the first panel member 69 in superimposed relationship thereto, and the hose H is then reversely folded back over the outside face of the second panel member 70. The second folded hose is now positioned over the reversely folded portion of the hose H.

Figure 27:
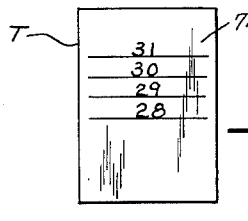
FIG. 27 is a top plan view of the final panel member illustrating the length calibration thereon.

The third single panel member 71 is now placed in superimposed relationship with respect to the second panel member 70. The third panel member, as shown in FIG. 27, is provided with graduations corresponding to the length of the hose H against which the free end of the welt portion of the hose will register. Accordingly, the third panel member 71 will be positioned with the graduated face being on the outside. The remaining portion of the hose H is then reversely folded over the back or outside face of the third panel member 71, with the welt end in registry with the length graduation. The toe portion of the hose H is now folded over the back face of the third panel member 71. This operation of folding the hose is basically the Z fold construction hereinbefore described.

To complete the formation of the hosiery package, the elevating mechanism 64 is rotated thereby elevating the bottom plate 63, as shown in FIG. 26. A wrapper envelope W is then slid over the assembled panel members and hose and withdrawn therefrom, resulting in the formation of the package shown in FIG. 28.

Reference is now to be had to FIGS. 29–32 wherein other forms of hosiery packages made in accordance with the present invention and showing other methods of positioning the toe portion of the hose are shown.

Figure 29:
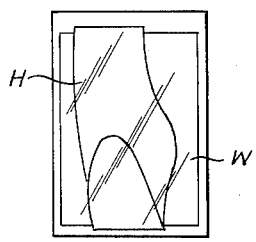
FIG. 29 is a top plan view of a modified form of completed hosiery package made in accordance with the present invention and illustrating a particular positioning of the toe portion of the hosiery.

In the form of the package shown in FIG. 29, the toe portion of the hose H is reversely folded upwardly to the left of the foot portion of the hose and lies in partially superimposed relationship thereto.

Figure 30:
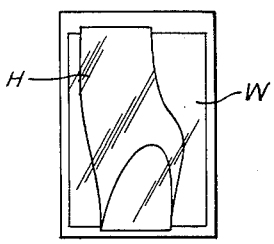
FIG. 30 is a top plan view of a modified form of completed hosiery package made in accordance with the present invention and illustrating a particular positioning of the toe portion of the hosiery.

In the form of the package shown in FIG. 30, the toe portion of the hose H is reversely folded upon itself to the right with respect to the foot portion of the toe and lies in partially superimposed relationship.

Figure 31:
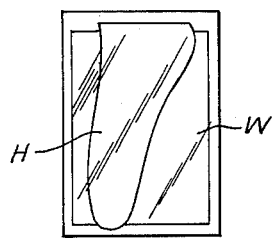
FIG. 31 is a top plan view of a modified form of completed hosiery package made in accordance with the present invention and illustrating a particular positioning of the toe portion of the hosiery.

The form of the hosiery package shown in FIG. 31 is one in which the toe portion is not folded but the hose H is so positioned that the toe portion joins approximately the bottom edge of the insert and is not folded.

Figure 32:
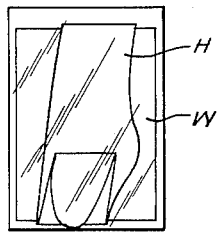
FIG. 32 is a top plan view of a modified form of completed hosiery package made in accordance with the present invention and illustrating a particular positioning of the toe portion of the hosiery.
Figure 24:
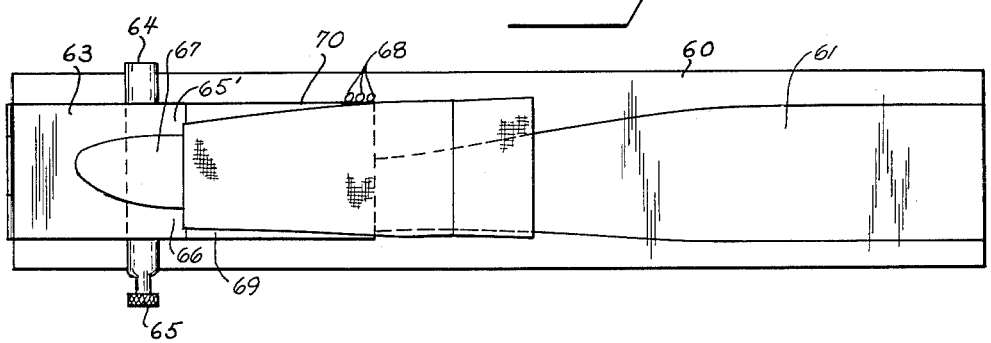
FIG. 24 is a top plan view of the apparatus shown in FIG. 22 illustrating the hose in a second stage of folding.
Figure 25:
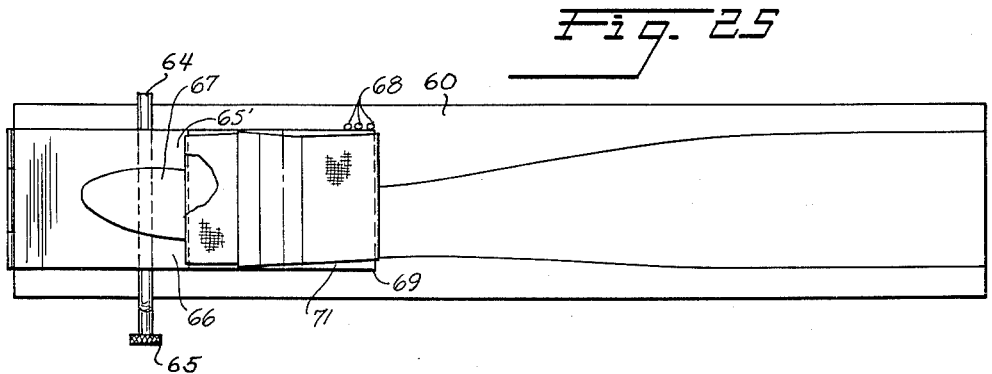
FIG. 25 is a top plan view of the apparatus shown in FIG. 22 illustrating the hose in the final folded state.

The form of the hosiery package shown in FIG. 32 is one in which the toe portion is reversely folded directly back over the foot portion of the hose and then reversed again upon itself.

Each of these packages may be made in accordance with any of the methods hereinbefore described. The only variation will be in the folding operation in which the toe portion of the hose in each instance is positioned in a distinctly different manner relative to the panel member.

Each of the foregoing packages showing modifications of the toe portion are shown and disclosed in our co-pending design applications Serial Nos. 48,795, 48,796, 48,797, 48,798, and 48,799.

Reference is now to be had to FIGS. 33–37 wherein other forms of the hosiery packages made in accordance with the present invention are illustrated.

Figure 33:
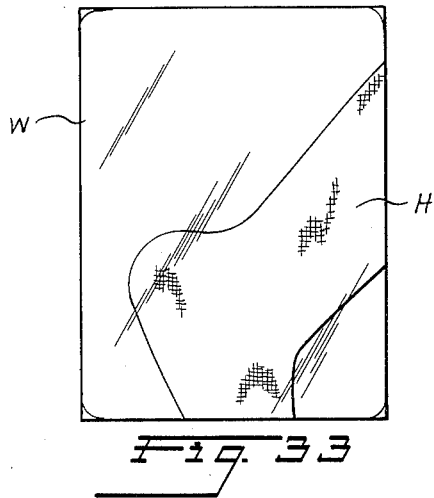
FIG. 33 is a top plan view of a modified form of the completed hosiery package made in accordance with the present invention illustrating another form of positioning and folding of the toe portion of the hosiery.
Figure 34:
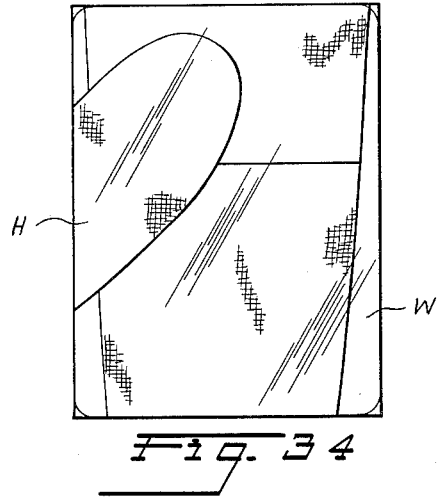
FIG. 34 is a top plan view of the opposite side of the package shown in FIG. 33.

In FIGS. 33 and 34, the toe portion of the hose H instead of being folded upon itself or back over the edge of the panel opposite the edge over which the ankle portion of the hose is folded, is folded over the side edge of the panel and is in engagement with the welt portion of the hose from the opposite face of the panel, as shown in FIG. 34. The package shown in FIGS. 33 and 34 may be made in accordance with any of the methods hereinbefore described with the modifications with respect to the folding of the toe portion.

Figure 35:
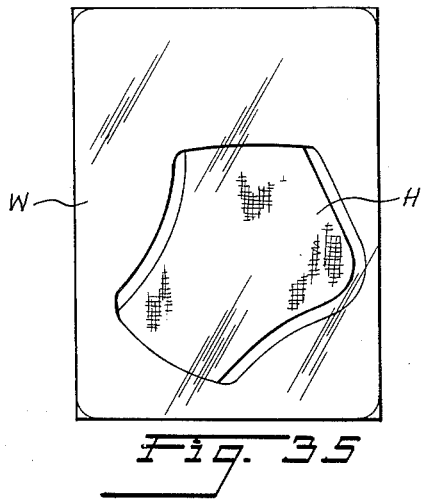
FIG. 35 is a top plan view of still another modified form of a hosiery package made in accordance with the present invention illustrating the use of an additional panel member having a cut-out area to frame the ankle, foot, and heel area of the hose.

FIG. 35 illustrates a hosiery package in which an additional panel member is shown which is provided with a cut-out area to frame the ankle, heel, and foot portion of the hose H. To produce this package, the panel member having the cut-out area is first laid down on the worktable and the hose is positioned thereover with the ankle, heel and foot portion centered with respect to the cut-out area. The hosiery package may then be completed following any of the methods hereinbefore described. The toe portion of the hose H may be folded over either the bottom or the side edge of the panel member, or may be folded in any of the other manners hereinbefore illustrated and described.

Figure 36:
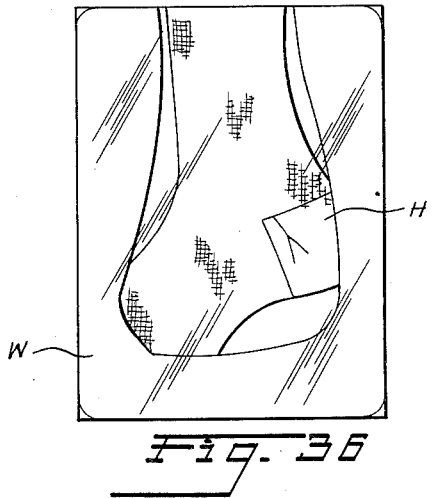
FIG. 36 is a top plan view of still another modified form of a hosiery package made in accordance with the present invention illustrating the use of an additional panel having a cut-out area to frame the ankle, foot, and heel area of the hose.

The package shown in FIG. 36 is similar to the package shown in FIG. 35 with the exception that the panel member having the cut-out area is provided with an enlarged slotted area wherein the entire ankle portion of the hose is shown. This package may be made in the same manner as the package shown in FIG. 35 in which the panel member having a slotted area is placed on the worktable first, and the hose H is then placed thereover.

Figure 37:
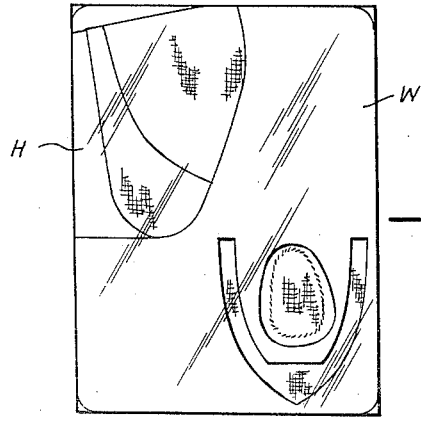
FIG. 37 is a top plan view of another form of a hosiery package made in accordance with the present invention particularly adapted for use with a so-called cushion foot type of hose.

FIG. 37 illustrates a form of hosiery package found to be of particular utility with ladies' hosiery in which a cushioned or padded foot portion is employed. In this form of the invention, an extra panel member having an upper corner portion removed providing a cut-out area in the upper lefthand corner is shown. The extra panel member is also provided with a slotted area in the lower righthand corner forming a tongue portion which has a cut-out area in which the cushion portion of the hose will be positioned. To produce this form of the package, the extra panel member having the cut-out area therein is first placed on the worktable. The hose H is then positioned thereover with a portion of the heel and ankle portion being positioned relative to the corner of the panel member which has been removed. The foot and toe portion in which the cushioned pad is contained is then folded upon itself and in angular relationship with respect to the remaining part of the hose such that the cushion portion of the hose will register with the opening in the formed tongue portion and the lower righthand corner of the extra panel member. The hosiery package is then completed by following any of the operational steps hereinbefore described in connection with the other forms of the invention.

Full fashioned hosiery is best suited for utilization with the packages made in accordance with the present invention. While seamless hosiery can be packaged with the present invention, such hosiery must be of an extremely high quality since such hosiery will not be presented to its best advantage with the present invention unless so made. Similarly, it is to be clearly understood that stretchy hosiery can be successfully packaged in accordance with the present invention.

While there have been described herein what are at present considered preferred embodiments of the invention, it will be obvious to those skilled in the art that modifications and changes may be made without departing from the essence of the invention. It is therefore to be understood that the exemplary embodiments are illustrative and not restrictive of the invention, the scope of which is defined in the appended claims, and that all modifications that come within the meaning and range of equivalency of the claims are intended to be included therein.

We claim:

1. The method of forming a hosiery package comprising placing a single hose in a flat, laid out state, placing panel means over the foot, ankle, and heel portion of the hose, reversely folding the leg portion of the hose over the panel means, placing another panel means over the folded portion of the hose, placing at least a second hose between the panel means, and placing the panel means and hosiery in transparent wrapper means.

2. The method of forming a hosiery package comprising placing a single hose in a flat, laid out state, placing panel means over the foot, ankle, and heel portion of the hose, reversely folding the leg portion of the hose over the panel means, reversely folding the toe portion of the hose, placing another panel means over the folded portion of the hose, placing at least a second hose between the panel means, and placing the panel means and hosiery in transparent wrapper means.

3. The method of forming a hosiery package comprising placing a single hose in a flat, laid out state, placing panel means over the foot, ankle, and heel portion of the hose, reversely folding the leg portion of the hose over the panel means, reversely folding the toe portion of the hose over the back face of the panel means, placing another panel means over the folded portion of the hose, placing at least a second hose between the panel means, and placing the panel means and hosiery in transparent wrapper means.

4. The method of forming a hosiery package comprising placing a single hose in a flat, laid out state, placing panel means over the foot, ankle, and heel portion of the hose, reversely folding the leg portion of the hose over the panel means, reversely folding the toe portion of the hose over the bottom edge of the panel means, placing another panel means over the folded portion of the hose, placing at least a second hose between the panel means, and placing the panel means and hosiery in transparent wrapper means.

5. The method of forming a hosiery package comprising placing a single hose in a flat, laid out state, placing panel means over the foot, ankle, and heel portion of the hose, reversely folding the leg portion of the hose over the panel means, reversely folding the toe portion of the hose over a side edge of the panel means, placing another panel means over the folded portion of the hose, placing at least a second hose between the panel means, and placing the panel means and hosiery in transparent wrapper means.

6. The method of forming a hosiery package comprising placing a single hose in a flat, laid out state, placing panel means over the foot, ankle, and heel portion of the hose, reversely folding the leg portion of the hose over the panel means, placing another panel means over the folded portion of the hose, placing at least a second hose between the panel means, reversely folding the toe portion of the hose, and placing the panel means and hosiery in transparent wrapper means.

7. The method of forming a hosiery package comprising placing a single hose in a flat, laid out state, placing panel means over the foot, ankle, and heel portion of the hose, reversely folding the leg portion of the hose over the panel means, placing another panel means over the folded portion of the hose, placing at least a second hose between the panel means, reversely folding the toe portion of the hose over the back face of the second panel member, and placing the panel means and hosiery in transparent wrapper means.

8. The method of forming a hosiery package comprising placing a single hose in a flat, laid out state, placing panel means over the foot, ankle, and heel portion of the hose, reversely folding the leg portion of the hose over the panel means, placing another panel means over the folded portion of the hose, placing at least a second hose between the panel means, reversely folding the toe portion of the hose over the bottom edges of the panel members, and placing the panel means and hosiery in transparent wrapper means.

9. The method of forming a hosiery package comprising placing a single hose in a flat, laid out state, placing panel means over the foot, ankle, and heel portion of the hose, reversely folding the leg portion of the hose over the panel means, placing another panel means over the folded portion of the hose, placing at least a second hose between the panel means, reversely folding the toe portion of the hose over the side edges of the panel members, and placing the panel means and hosiery in transparent wrapper means.

10. The method of forming a hosiery package comprising placing a single hose in a flat, laid out state, placing panel means over the foot, ankle, and heel portion of the hose, reversely folding the leg portion of the hose over the panel means, placing another panel means over the folded portion of the hose, reversely folding the remaining portion of the hose over the back face of the second panel means, placing at least a second hose between the panel means, and placing the panel means and hosiery in transparent wrapper means.

11. The method of forming a hosiery package comprising placing a single hose in a flat, laid out state, placing panel means over the foot, ankle, and heel portion of the hose, reversely folding the leg portion of the hose over the panel means, placing another panel means over the folded portion of the hose, reversely folding the remaining portion of the hose over the back face of the second panel means, reversely folding the toe portion of the hose, placing at least a second hose between the panel means, and placing the panel means and hosiery in transparent wrapper means.

12. The method of forming a hosiery package comprising placing a single hose in a flat, laid out state, placing panel means over the foot, ankle, and heel portion of the hose, reversely folding the leg portion of the hose over the panel means, placing another panel means over the folded portion of the hose, reversely folding the remaining portion of the hose over the back face of the second panel means, reversely folding the toe portion of the hose over the back face of the panel means, placing at least a second hose between the panel means, and placing the panel means and hosiery in transparent wrapper means.

13. The method of forming a hosiery package comprising placing a single hose in a flat, laid out state, placing panel means over the foot, ankle, and heel portion of the hose, reversely folding the leg portion of the hose over the panel means, placing another panel means over the folded portion of the hose, reversely folding the remaining portion of the hose over the back face of the second panel means, placing at least a second hose between the panel means, reversely folding the toe portion of the hose, and placing the panel means and hosiery in transparent wrapper means.

14. The method of forming a hosiery package comprising placing a single hose in a flat, laid out state, placing panel means over the foot, ankle, and heel portion of the hose, reversely folding the leg portion of the hose over the panel means, placing another panel means over the folded portion of the hose, reversely folding the remaining portion of the hose over the back face of the second panel means, placing at least a second hose between the panel means, reversely folding the toe portion of the hose over the back face of the second panel member, and placing the panel means and hosiery in transparent wrapper means.

15. The method of forming a hoisery package comprising placing a single hose in a flat, laid out state, placing panel means over the foot, ankle, and heel portion of the hose, reversely folding the leg portion of the hose over the panel means, placing another panel means over the folded portion of the hose, reversely folding the remaining portion of the hose over the back face of the second panel means, placing at least a second hose between the panel means, reversely folding the toe portion of the hose over the bottom edges of the panel members, and placing the panel means and hosiery in transparent wrapper means.

16. The method of forming a hosiery package comprising placing a single hose in a flat, laid out state, placing panel means over the foot, ankle, and heel portion of the hose, reversely folding the leg portion of the hose over the panel means, placing another panel means over the folded portion of the hose, reversely folding the remaining portion of the hose over the back face of the second panel means, placing at least a second hose between the panel means, reversely folding the toe portion of the hose over the side edges of the panel members, and placing the panel means and hosiery in transparent wrapper means.

17. The method of forming a hosiery package comprising placing a single hose in a flat, laid out state, placing panel means over the foot, ankle, and heel portions of the hose, reversely folding the leg portion of the hose upon itself, placing another panel means over said folded hose, placing at least a second hose between the panel means, reversely folding the remaining portion of the hose over the back face of the second panel means, and placing the panel means and hosiery in transparent wrapper means.

18. The method of forming a hosiery package comprising placing a single hose in a flat, laid out state, placing panel means over the foot, ankle, and heel portion of the hose, reversely folding the leg portion of the hose upon itself, placing another panel means over said folded hose, placing at least a second hose between the panel means, reversely folding the remaining portion of the hose over the back face of the second panel means, reversely folding the toe portion of the hose, and placing the panel means and hosiery in transparent wrapper means.

19. The method of forming a hosiery package comprising placing first panel means in a flat, laid out state, said first panel means having at least one cut-out area therein, placing the single hose in a flat, laid out state with the foot, ankle and heel portion of the hose in superimposed relationship with said first panel means, with pertinent portions of said foot, ankle and heel portion being framed by said cut-out area, placing second panel means over the foot, ankle, and heel portion of the hose, reversely folding the leg portion of the hose over the panel means, placing another panel means over the folded portion of the hose, placing at least a second hose between the panel means, and placing the panel means and hosiery in transparent wrapper means.

20. The method in accordance with claim 19 wherein the toe portion of the hose is reversely folded.

21. The method of forming a hosiery package comprising placing a single hose in a flat, laid out state, placing first insert means over the ankle and heel area of the single hose, reversely folding the leg part of the hose over the first insert means, placing second insert means over a portion of the leg part of the hose, reversely folding the remaining part of the hose back over the second insert means, reversely folding the toe portion of the hose, placing a second hose between the insert means, and placing the hosiery in transparent wrapper means.

22. The method of forming a hosiery package comprising placing a single hose in a flat, laid out state, placing first insert means over the ankle and heel area of the hosiery, reversely folding the leg part of the hose over the insert means, placing second insert means over a portion of the leg part of the hose, reversely folding the remaining portion of the hose back over the opposite face of the second insert means, placing a third insert means over the leg part of the hose, reversely folding the remaining portion of the hose back over the face of the third insert means, reversely folding the toe portion of the hose, placing a second hose between the faces of two of the insert means, and placing the hosiery in wrapper means.

(References on following page)

References Cited in the file of this patent

UNITED STATES PATENTS

| | | |
|---|---|---|
| 2,230,559 | Cartier | Feb. 4, 1941 |
| 2,521,529 | Mauney | Sept. 5, 1950 |
| 2,573,827 | Bigelow | Nov. 6, 1951 |
| 2,593,325 | Mathews | Apr. 15, 1952 |
| 2,661,887 | Yalick et al. | Dec. 8, 1953 |
| 2,755,924 | Tuttle et al. | July 24, 1956 |
| 2,773,340 | McCarthy | Dec. 11, 1956 |
| 2,788,172 | Malley | Jan. 22, 1957 |
| 2,824,414 | Fieman et al. | Feb. 25, 1958 |

FOREIGN PATENTS

| | | |
|---|---|---|
| 684,428 | Germany | Nov. 28, 1939 |
| 783,735 | Great Britain | Sept. 25, 1957 |
| 790,443 | Great Britain | Feb. 12, 1958 |